United States Patent [19]
Yamaguchi

[11] Patent Number: 5,915,511
[45] Date of Patent: Jun. 29, 1999

[54] LOCK-UP CLUTCH

[75] Inventor: Mitsugu Yamaguchi, Neyagawa, Japan

[73] Assignee: Exedy Corporation, Neyagawa, Japan

[21] Appl. No.: 08/888,808

[22] Filed: Jul. 7, 1997

[30] Foreign Application Priority Data

Jul. 10, 1996 [JP] Japan .................................... 8-180940

[51] Int. Cl.[6] .................................................. F16D 33/00
[52] U.S. Cl. ...................................... 192/3.29; 192/213.1
[58] Field of Search ................................. 192/3.28, 3.29, 192/213.1

[56] References Cited

U.S. PATENT DOCUMENTS

| | | | |
|---|---|---|---|
| 4,422,535 | 12/1983 | Ling ........................................ | 192/3.28 |
| 4,441,594 | 4/1984 | Kubo et al. ............................ | 192/3.28 |
| 4,559,024 | 12/1985 | Tamuro et al. ................ | 192/213.12 X |
| 4,668,207 | 5/1987 | Koshimo ........................ | 192/213.21 X |
| 4,768,633 | 9/1988 | Kubo et al. .............................. | 192/3.3 |
| 5,080,215 | 1/1992 | Forster et al. ..................... | 192/3.29 X |
| 5,139,122 | 8/1992 | Maeda et al. . | |
| 5,246,399 | 9/1993 | Yanko et al. .................... | 192/213.1 X |

FOREIGN PATENT DOCUMENTS 3-20151  1/1991  Japan .

Primary Examiner—Charles A. Marmor
Assistant Examiner—Saúl J. Rodriguez
Attorney, Agent, or Firm—Shinjyu An Intellectual Property Firm

[57] ABSTRACT

The drive plate 25 in the lock-up clutch 15 is composed of the ring portion 32 and a plurality of protrusions 33 being positioned around the ring portion 32. The protrusion 33 has the piston connecting part 34 which projects outward in a radial direction from the ring portion 32 and connects with the piston 16 in a manner not to rotate but to move freely in an axial direction. The protrusion 33 also has the coil spring connecting part 35 which project inward in a radial direction from the ring portion 32. There is the opening 36 in the protrusion 33. The side plate 27 is placed at the side of the drive plate 25 and has the first coil spring receptacle 37 at the outer circumferential side corresponding to the coil spring connecting part 35 and has the second coil spring receptacle 39 at the inner circumferential side. The inner circumferential part of the driven plate 26 is fixed to the turbine 3. The first coil spring 30 is put in between the coil spring connecting part 35 and the first coil spring receptacle 37 and is elastically flexible in a circular direction. The openings 36 serve to reduce the weight of a drive plate 25, and the pins extending through the openings 36 provide structural strength.

3 Claims, 3 Drawing Sheets

LOCK-UP CLUTCH

BACKGROUND OF THE INVENTION

A. Field of the Invention

The present invention relates to a lock-up clutch used in a torque converter, and more particularly, a lock-up clutch having a torsion spring which enables a power input portion of the torque converter and a power output portion of the torque convertor to undergo limited relative rotary displacement with the lock-up clutch engaged therebetween.

B. Description of the Related Art

A lock-up clutch is known for use in a torque converter. Such a lock-up clutch includes a piston, a driven plate, and a torsion spring connecting the piston and the driven plate elastically in the circumferential direction. Typically, the driven plate is connected to the turbine or a hub which support the turbine. The piston can be engaged with a front cover of the torque converter through a friction element formed on the piston.

The lock-up clutch may also include a damper mechanism which is composed of a plate element and a plurality of torsion springs between the piston and the driven plate. An input element in such a damper mechanism is engaged with the piston in a manner so as to rotate with the piston by may move in the axial direction relative to the lock-up clutch.

Among damper mechanisms with such a basic structure, an intermediate member is placed between the input element and the output element, and wherein the input element and the intermediate member are connected by the first elastic member, and wherein the intermediate member and the output element is connected by the second elastic member. Since two kinds of elastic members act in series in such a mechanism, the performance of both low rigidity and wide angle of twist is obtained. In the above-mentioned structure, a relatively thick annular drive plate is used as an input element to engage the piston, a driven plate is an output element radially inside of the drive plate in the radial direction, and a pair of annular side plates as an intermediate member are placed at each axial side of the drive and driven plates.

The above-mentioned drive plate radially outward projections which engage grooves in a tube portion of the piston in a manner so as to rotate therewith but to undergo movement in the axial direction with respect thereto. Radially inward projection on the drive plate engage the first elastic member.

However, the drive plate is relatively large in size because of the configuration of the piston engagement part and the first elastic engagement part. The drive plate is also heavy because of its size and thickness. As the result, strong centrifugal forces is applied to the plate at a high speed of rotation, and the drive plate undergoes a significant level of stress and can fail or deform.

According to the structure mentioned above, the first and second coil elements are disposed in two kinds of window holes of the pair of the side plates, respectively.

There is the possibility that the first elastic elements, which is outside in the radial direction, deforms both side plates. In another words, since stronger centrifugal force is applied to the first elastic members which are located at longer distance from the center of the disk, the first elastic member presses the outer circumferential edges of the receptacles of the pair of side plates diagonally outward and in both the axial direction so as to separate both side plates. Subsequently, both side plates may be deformed, a damper mechanism may go out of order, and the side plate is in danger of being broken.

SUMMARY OF THE INVENTION

One objective of the present invention is to attempt to reduce the mass of a drive plate of a lock-up clutch used for a torque converter, while keeping the strength of the drive plate.

The other purpose of the present invention is to prevent deformation of portions of a lock-up clutch used for a torque converter.

In accordance with one aspect of the present invention, a lock-up clutch for a torque converter includes a piston disposed on a turbine hub between a front cover and a turbine within a torque convertor. The piston is configured for axial movement with respect to the front cover and the turbine hub for selective engagement with the front cover. A driven plate is fixed to the turbine hub. The driven plate has a first window formed therein. A pair of side plates are rigidly connected to one another and disposed on each axial side of the driven plate. The side plates are configured for relative rotary displacement with respect to the side plates. Each of the side plates are formed with second windows and third windows. An annular drive member is disposed radially outward from the driven plate. The drive member is disposed between the side plates. The drive member is formed with a ring portion and a plurality of protrusions formed cirumferentially about the ring portion. Each of the protrusions have an engaging part extending radially outward from the ring portion engaging a corresponding portion of the piston such that the piston may undergo limited axial movement with respect to the drive plate. The piston engages the engaging part for rotation with the driven plate. The drive plate is further formed with a fourth window radially inward from the ring portion. The protrusions is further formed with an opening disposed radially inward from the engaging part. A first elastic member is disposed within the first window and the second windows limiting relative rotation between the driven plate and the side plates. A second elastic member is disposed within the third windows and the fourth windows limiting relative rotary displacement between the drive plate and the side plates. A plurality of pins extend through the opening in the protrusions. The pins further extend through and are fixed to the side plates. The pins are configured to limit relative rotation between the drive plate and the side plates.

Preferably,the driven plate and the drive plate are axially offset from one another, and the side plates are formed with a plurality of axially offset surfaces for engagement with the driven and drive plates.

Preferably, the opening has a circumferential length greater than its radial length.

Instead of using a solid drive plate as in the prior art, the drive plate of the present invention is formed with relatively large openings. As the result, the centrifugal force being applied to the plate element decreases because of its reduced mass, leading to the effective prevention of damage or deformation of the annular drive member by the centrifugal force.

The openings in the drive plate serve two purposes. First, the openings reduce the mass of the drive plate and second, the openings provide a rotation limiting means which the pins can engage for limiting relative rotary displacement between the drive plate and the side plates. As well, the pins provide structural strength to the side plates such that they are less likely to undergo deformation due to centrifugal forces and less likely to deform due to engagement with the elastic members.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

Figure 1:
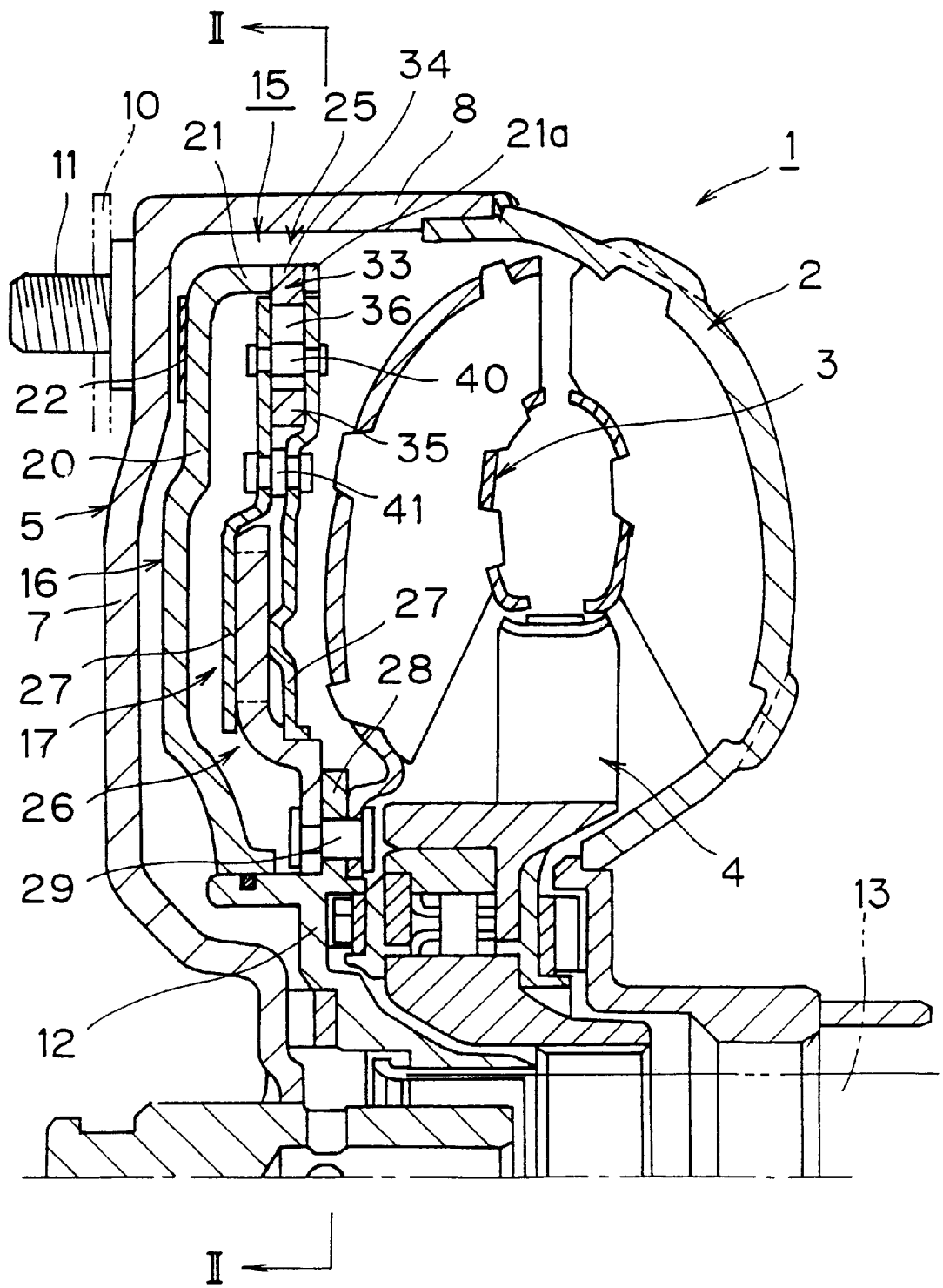
FIG. 1 is a fragmentary, side section view showing a torque converter having a lock-up clutch mechanism that includes a damper mechanism in accordance with one embodiment of the present invention.

A torque converter 1 is depicted in FIG. 1, which includes an impeller 2, a turbine 3, a stator 4 and a front cover 5. The front cover 5 is typically connected to a crankshaft of an engine (not shown). The engine is disposed to the left of the torque converter 1, with respect to FIG. 1. Hereinafter, the left side of FIG. 1 will be referred to as the engine side. A transmission (not shown) is disposed to the right of FIG. 1. Hereinafter, the right side of FIG. 1 will be referred to as the transmission side.

The front cover 5 includes a disk element 7 generally extending in a radial direction, and a cylinder-like wall 8 extending axially from an outer circumferential edge of the disk element 7 toward the impeller 2. An end of the cylinder-like wall 8 is fixed to an end of an outer shell of the impeller 2. The disk element 7 is coupled to a drive plate 10 of an engine (not shown) by studs 11. The turbine 3 is positioned between the disk element 7 and the impeller 2. A turbine hub 12 supports an inner circumferential part of the turbine 3. The turbine hub 12 is connected to a main drive shaft 13.

The torque converter 1 has a lock-up clutch 15. The lock-up clutch 15 includes a piston 16 and a damper mechanism 17. The piston 16 includes a disk part 20 extending radially adjacent to the disk element 7 of the front cover, and a cylinder-like wall 21 projecting from an outer circumferential edge of the disk part 20 toward the impeller 2. The disk part 20 has an friction facing 22 on a radially extending surface thereof, facing the disk element 7. An inner circumferential part of the disk 20 engages an axially extending cylindrical portion of the turbine hub 12. The axially extending cylindrical portion is formed with a recess which retains a seal. The disk 20 is configured to move axially along the axially extending cylindrical portion of the turbine hub 12 such that the disk 20 engages the seal.

Figure 2:
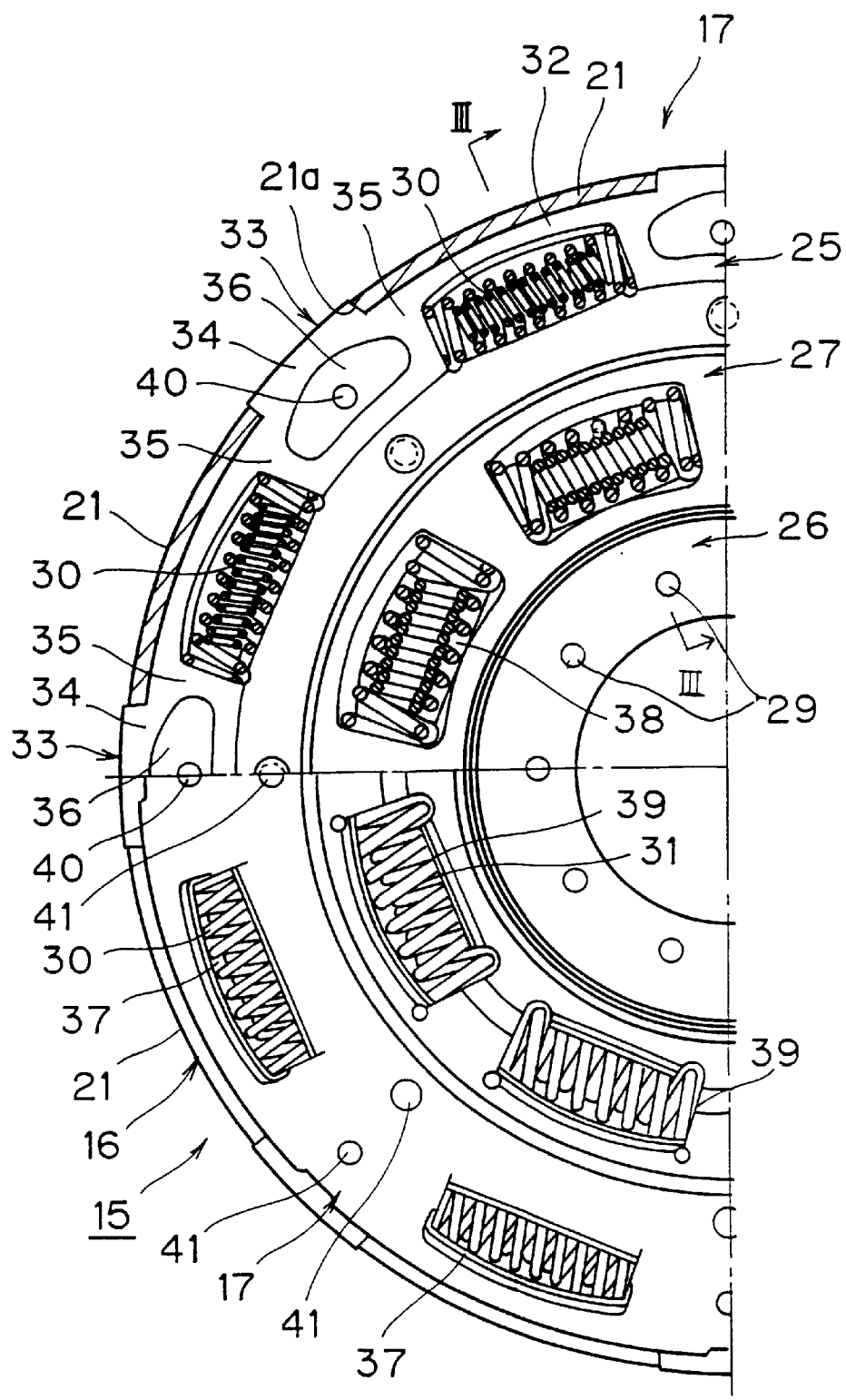
FIG. 2 is a fragmentary, part section, part elevation rear view of the torque convertor taken along the line II—II, looking in the direction of the arrow, showing details of the damper mechanism in the lock-up clutch mechanism.
Figure 3:
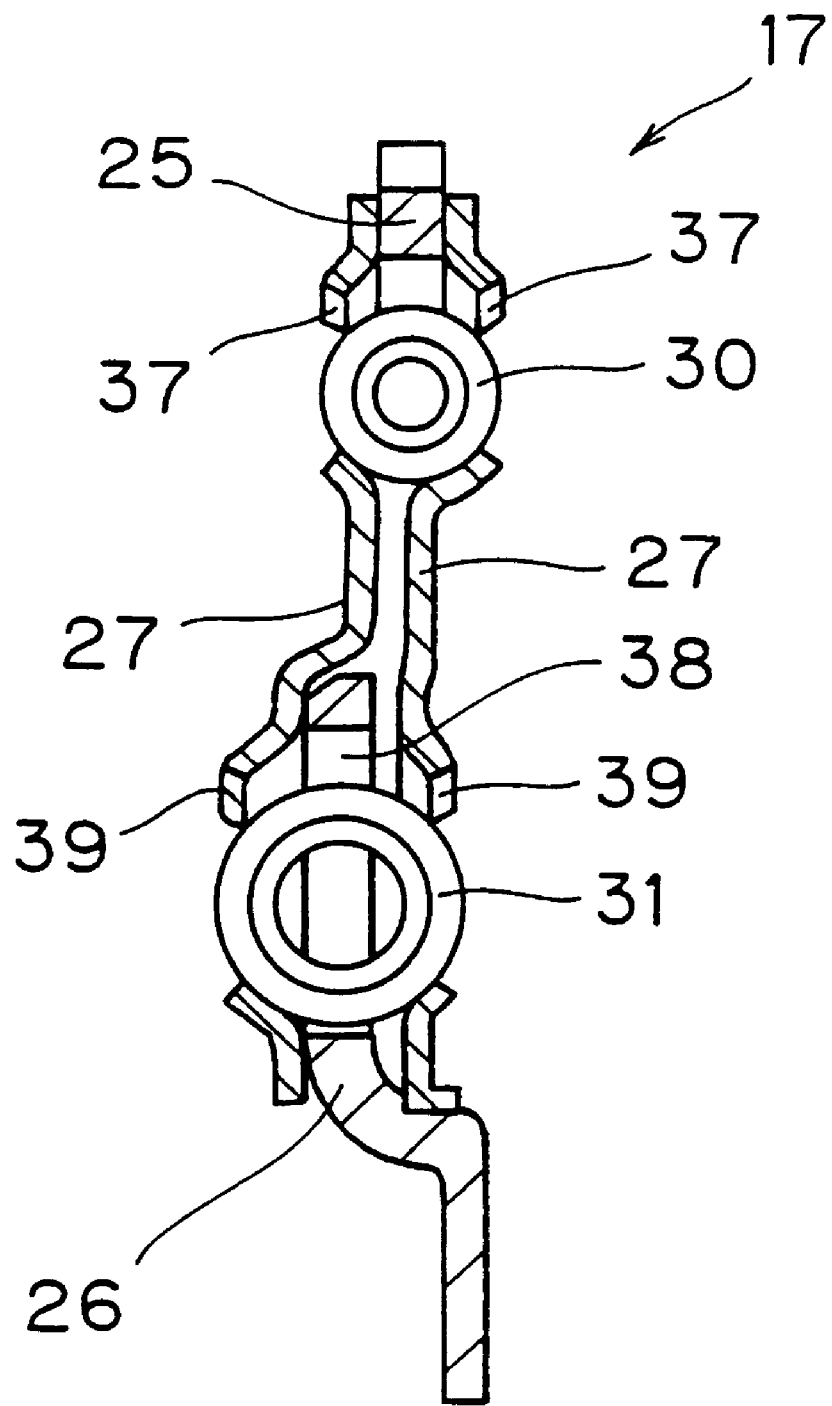
FIG. 3 is a fragmentary, side section of the damper mechanism taken along the line III—III in FIG. 2, looking in the direction of the arrows.

FIG. 2 is a fragmentary, part section, part elevation rear view of a portion of the lock-up clutch 15, and FIG. 3 is a side section of a portion of the damper mechanism 17 shown in FIG. 2. The damper mechanism 17 includes an annular drive plate 25 disposed in an outer circumferential portion of the damper mechanism 17. The annular drive plate 25 is disposed radially outward from a disk-like driven plate 26.

As shown in FIGS. 1 and 3, the drive plate 25 and the driven plate 26 are made of relatively thick plate metal (in an axial direction). A pair of disk-like side plates 27 are disposed on either axial side of the drive plate 25 and the driven plate 26. The drive plate 25 may undergo limited relative rotary displacement with respect to the side plates 27. Likewise, the driven plate 26 may undergo limited relative rotary displacement with respect to the side plates 27. The drive plate 25 and the side plates 27 are connected in a circular direction by the first coil spring 30 which is composed of co-axial coil springs. The side plates 27 and the driven plate 26 are connected in a circular direction by the second coil spring 31 which is composed of co-axial coil springs. An inner circumferential side of the driven plate 26 is fixed to an outer flange 28 of the turbine by rivets 29.

As shown in FIG. 2, the drive plate 25 has a ring portion 32 which is relatively small in size in a radial direction but has formed thereon a plurality of radially extending protrusions 33 which are integrally formed with the ring portion 32 at spaced apart intervals in a circular direction along the ring portion 32. Each protrusion 33 has a piston connecting part 34 projecting outward in a radial direction from the ring portion 32, and a coil ring connecting part 35 projecting inward in a radial direction from the ring portion 32. The piston connecting part 34 is engaged with grooves 21a of the cylinder-like wall 21 of the piston 16 in a manner which prevents relative rotation between the piston 16 and the drive plate 25 but allows the piston 16 to slide freely in an axial direction relative to the drive plate 25.

The first coil spring 30 is disposed radially inside the ring portion 32 and between adjacent protrusion 33. The coil spring connecting part 35 is engaged with one end of the first coil spring 30 in a circular direction. The first coil spring 30, as shown in FIG. 3, extends slightly out from the sides of the drive plate 25 in an axial direction. The portions of the first coil spring 30 which extend out of the sides of the drive plate 25 are retained by in the window-like first coil spring receptacle 37 of both side plates 27, as shown in FIGS. 2 and 3.

The second coil spring 31 is placed in a similar way with the first spring 30, and put in a space defined by a hole 38 in the driven plate 26 and second coil spring receptacles 39 formed in each of the side plates 27.

Each of the protrusions 33 is formed with an opening 36. The plate 33 is an arc-like part which has a circumferential length greater than its radial length, as shown in FIG. 2. In other words, the opening 36 has a generally oval shape.

A pin 40 extends in an axial direction through a corresponding opening 36. As shown in FIG. 1, the pins 40 further extend through the side plates 27 and are fixed thereto. The pin 41 connects intermediate circumferential parts of both side plates 27 in an axial direction. The interaction between the openings 36 and the pins 40 restricts the total possible relative rotary displacement between the plate 25 and the plates 27.

The operation of the clutch 15 is described below. FIG. 1 shows the lock-up clutch 15 in a disengaged state with the friction facing 22 of the piston 16 spaced apart from the front cover 5. In this situation, the torque which is transmitted from the drive plate 10 to the impeller 2 via the front cover 5 is transmitted to the turbine 3 via hydraulic oil inside the torque converter, and further transmitted from the turbine 3 to the main drive shaft 13 via the turbine hub 12.

In engaging the lock-up clutch 15, fluid pressure between the piston 16 and the turbine causes the piston 16 to move toward the front cover 5 thereby bringing the friction facing 22 into engagement with the front cover 5. In this situation, the torque which is transmitted from the drive plate 10 to the front cover 5 is transmitted to the piston 16 via the friction facing 22. The torque is then transmitted from the piston 16 to the side plate 27 via the drive plate 25 and the first spring 30 in that order, and further transmitted from the side plate 27 to the driven plate 26 via the second coil spring 31, and finally transmitted from the driven plate 26 to the main drive shaft 13 via the turbine hub 12.

Since the first coil springs 30 and the second coil springs 31 act in series, the performance of both low rigidity and wide angle of twist is obtained. As the result, the torque fluctuation is prevented.

In engaging the lock-up clutch as mentioned above, the centrifugal force is applied to the drive plate 25. However, since the protrusion 33 is small in mass owing to the big opening, the strong centrifugal force is never applied to the protrusion 33. Therefore, the drive plate 25 should be difficult to damaged.

When in use and rotating, strong centrifugal force is applied outward in the radially outward direction to the first coil sprig 30 which is a predetermined distance from the center of the clutch. The first coil springs 30 are urged radially outward and the springs 30 may engage the outer circumferential edges of the first coil spring receptacles 37 of the side plates 27. Such engagement between the springs 30 and the outer circumferential edges of the first coil spring receptacles might tend to broaden both side plates 27. However, since both parts between the adjacent first coil spring receptacles 37 of both side plates 27 are fixed by the pins 40, the pins provide axial strength for the plates 27 thus prevent possible damage or deformation of the side plate 27.

In the present invention as described above, instead of usual solid plate elements, plate elements with an opening are used in the circular drive plate.

Since the centrifugal force decreases owing to the reduced mass of the plate element, damages and deformations of the drive plate by a centrifugal force are prevented effectively. In addition, the opening is available to a pin which prevent deformations of side plates.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

List of Reference Numerals Used in the Figures

1: torque converter
2: impeller
3: turbine
5: front cover
15: lock-up clutch
16: piston
25: drive plate
26: driven plate
27: side plate
30: the first coil spring
31: the second coil spring
32: ring portion
33: plate element
34: piston connecting part
35: coil spring connecting part
36: opening
37: the first coil spring receptacle
39: the second coil spring receptacle
40: pin

What is claimed is:

1. A lock-up clutch for a torque converter, the lock-up clutch comprising:

a piston disposed on a turbine hub between a front cover and a turbine within a torque convertor, said piston being configured for axial movement with respect to said front cover and said turbine hub for selective engagement with the front cover;

a driven plate fixed to the turbine hub, said driven plate having a first window formed therein;

a pair of side plates rigidly connected to one another and disposed on each axial side of said driven plate, said side plates configured for relative rotary displacement with respect to said side plates, each of said side plates being formed with second windows and third windows;

an annular drive member disposed radially outward from said driven plate, said drive member being disposed between said side plates, said drive member formed with a ring portion and a plurality of formed cirumferentially about said ring portion, each of said protrusions having an engaging part extending radially outward from said ring portion engaging a corresponding portion of said piston such that said piston may undergo limited axial movement with respect to said drive plate and said piston engages said engaging part for rotation with said driven plate, said drive plate further formed with a fourth window radially inward from said ring portion, said protrusions further formed with an opening disposed radially inward from said engaging part;

a first elastic member disposed within said first window and said second windows limiting relative rotation between said driven plate and said side plates;

a second elastic member disposed within said third windows and said fourth windows limiting relative rotary displacement between said drive plate and said side plates;

a plurality of first pins extending through said opening in said protrusions, said first pins further extending through and being fixed to said side plates, said pins configured to limit relative rotation between said drive plate and said side plates, said first pins being circumferentially spaced apart from one another about a first radius defined within the lockup clutch, and a second set of pins extending between said side plates fixing said side plate to one another, said second set of pins being circumferentially spaced apart from one another about a second radius defined within the lockup clutch, said first radius being larger than said second radius.

2. A lock-up clutch as set forth in claim 1, wherein said driven plate and said drive plate are axially offset from one another, and said side plates are formed with a plurality of axially offset surfaces for engagement with said driven and drive plates.

3. A lock-up clutch as set forth in claim 1, wherein said opening has a circumferential length greater than a radial length thereof.

* * * * *

UNITED STATES PATENT AND TRADEMARK OFFICE
CERTIFICATE OF CORRECTION

PATENT NO. : 5,915,511
DATED : June 29, 1999
INVENTOR(S) : Mitsugu Yamaguchi

It is certified that error appears in the above-identified patent and that said Letters Patent is hereby corrected as shown below:

Claim 1,
Line 18, after "plurality of" please insert -- protrusions --.

Signed and Sealed this

Twenty-sixth Day of March, 2002

Attest:

Attesting Officer

JAMES E. ROGAN
Director of the United States Patent and Trademark Office